July 29, 1952     R. N. KIRCHER ET AL     2,605,382
APPARATUS FOR COOKING

Filed Oct. 26, 1949                       2 SHEETS—SHEET 1

INVENTOR.
RALPH N. KIRCHER
LEONARD E. FINCH
BY John W. Michael
ATTORNEY

July 29, 1952     R. N. KIRCHER ET AL     2,605,382
APPARATUS FOR COOKING

Filed Oct. 26, 1949     2 SHEETS—SHEET 2

INVENTOR.
RALPH N. KIRCHER
BY LEONARD E. FINCH
John W. Michael
ATTORNEY

Patented July 29, 1952

2,605,382

UNITED STATES PATENT OFFICE 2,605,382

APPARATUS FOR COOKING

Ralph N. Kircher and Leonard E. Finch, West Bend, Wis., assignors to West Bend Aluminum Co., West Bend, Wis., a corporation of Wisconsin Application October 26, 1949, Serial No. 123,695

1 Claim. (Cl. 219—43)

This invention relates to electrical cooking apparatus of the type designed for portability and use wherever convenient.

An object of this invention is to provide electrical cooking apparatus which makes efficient use of the heat supply.

Another object is to provide electric cooking apparatus having a heating element carried in the base which is so ventilated as to permit use of the apparatus on any surface.

Another object is to provide electric cooking apparatus wherein the vessel is heated by means of radiant heat and by means of circulating hot air.

A further object is to provide a readily fabricated heating unit which directs the heat away from the surface supporting the unit.

A further object is to provide for the safe dissipation of waste heat from an electric heating unit to permit the heating element to be carried in a low position, thus rendering the apparatus more compact.

Other objects and advantages will be pointed out in, or be apparent from, the specification and claim, as will obvious modifications of the single embodiment shown in the drawings, in which:

Figure 1:
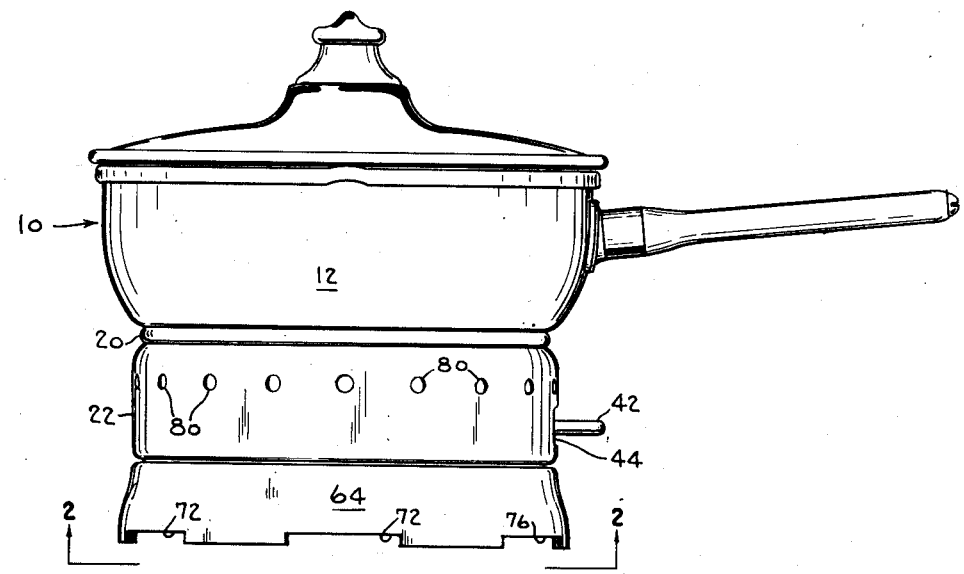
Fig. 1 is a side elevation of the complete cooking assembly as it appears when ready for use.
Figure 2:
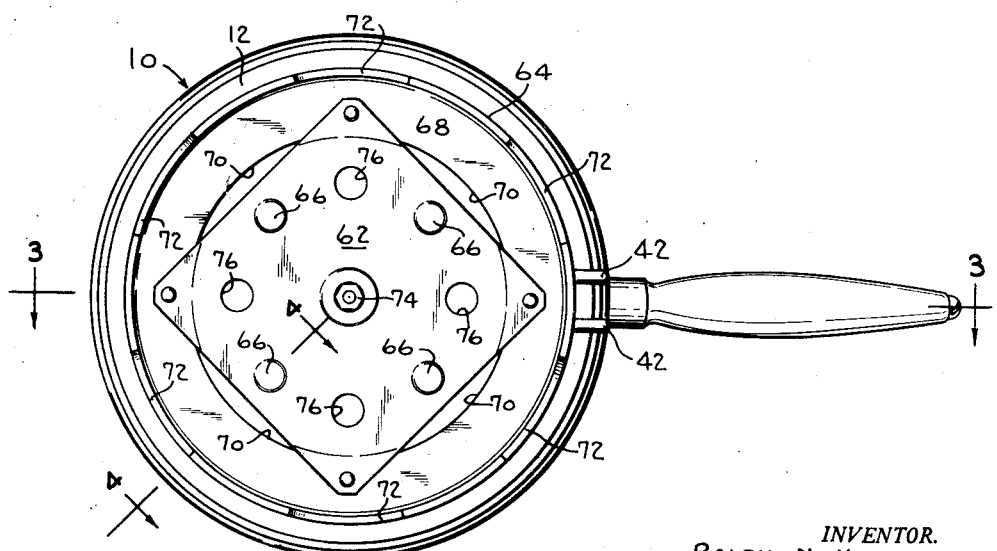
Fig. 2 is a bottom plan view of the apparatus taken as indicated by line 2—2 in Fig. 1.
Figure 3:
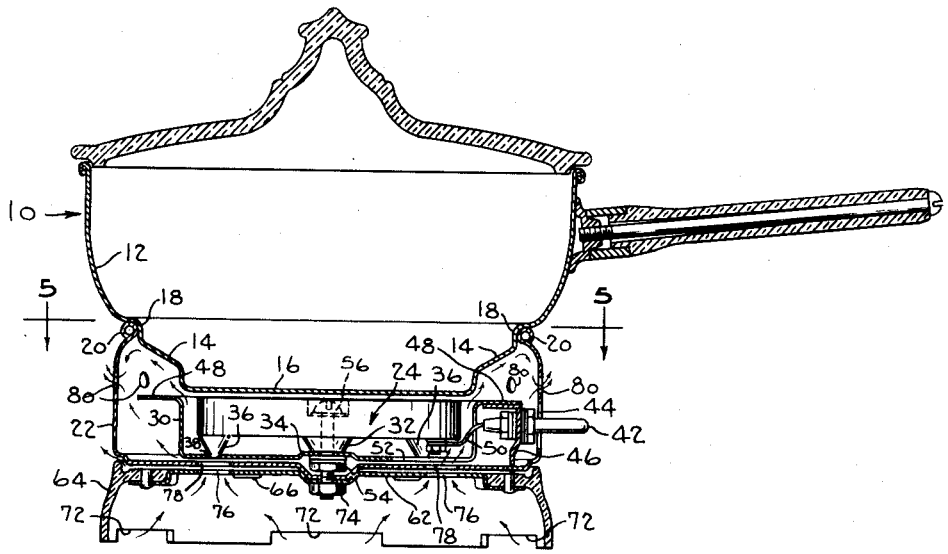
Fig. 3 is a vertical cross section of the apparatus taken as indicated by line 3—3 in Fig. 2.
Figure 4:
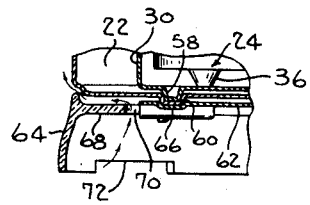
Fig. 4 is a fragmentary cross section on line 4—4 of Fig. 2.
Figure 5:
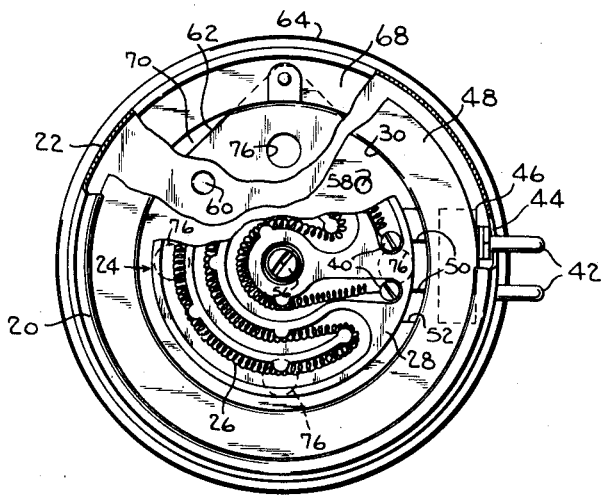
Fig. 5 is a top plan view, with parts broken away, of the heating assembly as viewed from line 5—5 in Fig. 3.

As may be seen in the drawings, this apparatus is principally designed to obtain what might be called a semi-deep well effect in heating the utensil 10 which has a slightly curved upper portion 12 and a generally frusto conical lower portion 14 terminating in a flat base 16. An annular seat 18 is formed between the curved and frusto conical portions to permit the utensil to rest on the rolled rim 20 of the cupped support 22 and thereby position the utensil bottom 16 over the heating element 24 comprising resistance coils 26 positioned in suitable channels in a ceramic member 28. The ceramic member is positioned within a cupped shell 30 which in turn is co-axial with the cupped support 22. The heating element 24 is spaced from the bottom of shell 30 by means of a central ceramic post 32 bearing against the central raised portion 34 on the shell bottom. The heating element is properly positioned within the shell by means of a plurality of depending conical legs 36 fitting within cooperating holes 38 in the shell bottom to radially align the resistance coil terminal posts 40 with the prongs 42 projecting out through a suitable aperture 44 in the side of support 22. The prongs are secured to a bracket 46 carried by and depending from shell flange 48 and are connected to the terminal posts by lead wires 50 which are brought in through the cut-out portion 52 of the shell 30. Thus the heating element and shell may be assembled separately and held in position by means of nut 54 threaded on the shaft of screw 56.

The assembled shell and heating element may now be placed within the cupped support 22 and properly related with respect to the support by means of a plurality of legs 58 pressed from the bottom of the shell and fitting into cooperating detents 60 formed in the support bottom. Detents 60 in the bottom of support 22 additionally serve to lock the support with respect to a spacer 62 carried by base 64 by fitting within cooperating detents 66 formed in the spacer. The corners of the generally square spacer are riveted to the inturned base flange 68 so that the spacer supports the entire unit with the support spaced from the base and the base flange. Since the spacer is square and the inner edge of the base flange 68 is circular, apertures 70 are left to permit air flow to the exterior of the unit through the opening between the base and the support. This insures adequate ventilation between these members and prevents overheating the base which is preferably of a non-conducting material.

The single screw 56 holds the entire assembly together by means of bolt 54 retaining the shell and heating element together and bolt 74 fixing the support, shell and heating element with respect to the spacer which is riveted to the base. The spacer and the bottom of the support 22 are provided with a plurality of cooperating holes 76, 78, respectively, which provide an air passage from the base up to the underside of the shell which is spaced from the support bottom by means of the shell legs 58. Thus air may circulate up against the bottom of the shell and out into the annular space between the shell and the support. The wall of the support is provided with a plurality of vents 80 which allow this cooling air to escape. It will be noted that one pair of cooperating holes 76, 78 in the spacer and support bottom lie under the lead wires 50 and the terminal posts 40 at the shell cut-out portion 52 to provide for directing cooling of these parts. This cut-out portion overlying these aligned apertures additionally provides for air flow into the space between the heating element and the shell. Air flowing into this space becomes heated and flows upwardly through the annular space between the shell and the element and rises along the generally frusto conical bottom portion of the utensil. As this rising air is cooled it tends to drop and is exhausted through vents 80.

Thus it will be apparent that the heating element heats the utensil bottom per se by radiation while the frusto conical portion of the utensil is constantly heated by rising hot air leaving the space between the heating element and the shell. It is to be noted that cooling air flowing up toward the vents 80 from between the shell bottom and the bottom of supports 22 cannot interfere with the rising hot air since the shell flange 48 directs the cooling air out toward the vent.

The air which is heated and rises between the heating element and the shell serves a further purpose of cooling the area between the element and the shell. The underside of the shell is cooled by means of air circulating between the shell and the support and rising to the vents. The base which may be of a non-conducting plastic is not in direct contact with the support. The spacer keeps the bottom from contacting the base and additionally provides for air circulation between the base and the support to keep the base cool.

Since the shell, support and spacer are metal they may be readily formed and easily fabricated. The shell, in addition to directing the heated air over the utensil bottom and directing the cooling air out toward the vents, serves to reflect heat upwardly toward the utensil. This not only increases the heat applied to the utensil but reduces the amount of heat directed toward the surface supporting the unit. The cupped support similarly reflects heat upwardly. Finally, the spacer may be chromium plated to reflect heat upwardly to insure against heating the base or the surface supporting the base.

To summarize, the flat bottom of the utensil is heated by radiation while the frusto conical lower portion is heated by hot air rising from the annular space between the heating element and the shell. The air supplied to this space comes from the base through the cooperating holes 76, 78 in the spacer and support bottom and through the cut-out 52 in the shell. The underside of the shell and the outer wall of the support are cooled by means of air coming through the spacer and the support bottom and flowing between the shell and the support. The base is cooled by means of air flow between the base and the support and the surface under the base is kept cool by reflecting heat upwardly by means of a polished surface on the spacer.

The cooking unit shown here is particularly designed for popping corn which requires high heat to insure complete and rapid popping. The design of the heating portion of the unit insures that the base and the supporting surface will remain cool at all times. Furthermore, the efficient dissipation of waste heat permits the heating element to be carried close to the supporting surface, thus reducing the over-all height of the apparatus. This makes attractive styling possible where similar devices have appeared strictly functional. While the utensil having a generally frusto conical lower portion between the support rim and the base of the utensil is particularly advantageous in combination with the heating unit, it will be appreciated that the heating unit may be used to advantage with other utensils.

Although but one embodiment of the present invention has been illustrated and described, it will be apparent to those skilled in the art that various changes and modifications may be made therein without departing from the spirit of the invention or from the scope of the appended claim.

What is claimed is:

Cooking apparatus comprising, in combination, a cupped support having a circular rim, a utensil having a flat bottom and a frusto conical wall, said wall resting on said rim with said bottom depending into said support, a heating element in said support and positioned below said bottom, a shell between and spaced from said element and said support, an inlet for admitting air to the space between said shell and said element to heat the air and pass it over said frusto conical utensil wall, another inlet for admitting air to the space between said shell and said support to cool said space, and a plurality of vents in said support for exhausting the air admitted through said inlets, said shell including a baffle in the form of an outwardly projecting peripheral flange for preventing the cooling air between said support and said shell from disturbing the flow of the heating air over the utensil wall.

RALPH N. KIRCHER.
LEONARD E. FINCH.

REFERENCES CITED

The following references are of record in the file of this patent:

UNITED STATES PATENTS

| Number | Name | Date |
|---|---|---|
| 1,706,908 | Westman | Mar. 26, 1929 |
| 2,046,200 | McArdle | June 30, 1936 |
| 2,089,521 | Wolcott | Aug. 10, 1937 |
| 2,287,583 | Weeks | June 23, 1942 |
| 2,365,615 | Woodman | Dec. 19, 1944 |
| 2,446,666 | Thompson | Aug. 10, 1948 |
| 2,496,654 | Alsdorf | Feb. 7, 1950 |

FOREIGN PATENTS

| Number | Country | Date |
|---|---|---|
| 330,569 | Germany | Dec. 17, 1920 |
| 883,147 | France | June 24, 1943 |